(12) United States Patent
Johnson et al.

(10) Patent No.: US 6,545,629 B1
(45) Date of Patent: Apr. 8, 2003

(54) FOB COMMAND MECHANIZATION

(75) Inventors: Susan Johnson, Rochester, MI (US); Iejas Desai, Sterling Heights, MI (US); Debbie Lambert, San Francisco, CA (US); Jonathan Clark, Provo, UT (US); Jeralyn Reese, Pasadena, CA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 380 days.

(21) Appl. No.: 09/591,780

(22) Filed: Jun. 12, 2000

Related U.S. Application Data

(60) Provisional application No. 60/139,236, filed on Jun. 14, 1999.

(51) Int. Cl.[7] ............................................... H04L 17/02
(52) U.S. Cl. ........................... 341/176; 200/3 R; 200/9
(58) Field of Search .......................... 341/176; 200/13, 200/5 R, 177, 9, 5 A, 341, 345, 1 B, 343, 512–517; 345/168, 169; 340/825.56, 539; 400/488, 490, 489; 455/128, 95

(56) References Cited

U.S. PATENT DOCUMENTS

| | | | | |
|---|---|---|---|---|
| 5,391,006 A | * | 2/1995 | Danziger | 400/488 |
| 5,644,113 A | * | 7/1997 | Date et al. | 200/5 R |
| 5,850,188 A | * | 12/1998 | Doyle et al. | 307/10.5 |
| 5,933,090 A | * | 8/1999 | Christenson | 307/10.2 |
| 5,952,629 A | * | 9/1999 | Yoshinaga et al. | 200/1 B |
| 6,288,709 B1 | * | 9/2001 | Willner et al. | 345/163 |

* cited by examiner

*Primary Examiner*—Michael Horabik
*Assistant Examiner*—Hung Dang

(57) ABSTRACT

A key fob for signaling a receiver on a vehicle includes a housing and a transmitter capable of transmitting multiple signals. The signals actuate multiple vehicle devices on the vehicle. Switches to control the signals include at least one dome protruding through the housing for initiating transmission of a signal. The dome includes a first element depressable for initiating a first signal and a second element depressable independently of the first element for initiating a second signal different from the first signal. The first element protrudes from the housing to a different height than the second element. Thus, the elements can be easily actuated separately from each other.

13 Claims, 2 Drawing Sheets

FOB COMMAND MECHANIZATION

This application claims priority to provisional patent application No. 60/139,236, which was filed Jun. 14, 1999. The subject invention relates generally to an improved vehicle key fob configuration.

BACKGROUND OF THE INVENTION

A key fob is an electronic transmitter for signaling a receiver on a vehicle. Typically, key fobs include a housing receiving the transmitter. The transmitter is capable of transmitting multiple signals for actuating multiple vehicle devices. One type of key fob provides the switches with domes protruding through the housing. Each of the domes is depressable for completing a circuit and initiating transmission of a different signal from the other domes. Each different signal actuates a different device on the vehicle such as, for example a door lock/unlock, a trunk unlatch, a panic alarm, and the like. Key fobs are carried with a key chain along with an ignition key. As more and more functions are provided on the key fob, the number of required switches increases. However, this also increases the necessary size of the key fob, which is undesirable.

Thus, it would be desirable to reduce the size of the key fob, and yet retain the functional attributes available with current designs. Because vehicles have ever increasing numbers of electronic devices, it is desirable to add functions to a key fob and not remove functions. Therefore, reducing the size of the key fob housing by simply eliminating remote control functions is not desirable. Thus, it would be preferable to reduce the area required for the switches controlling each of these function.

SUMMARY OF THE INVENTION AND ADVANTAGES

The present invention discloses a switch assembly that provides two elements to control two functions. A key fob for signaling a receiver on a vehicle includes a housing having a transmitter. The transmitter is capable of transmitting multiple signals for actuating multiple vehicle devices. Switches are provided in the housing by a plurality of domes, which protrude through the housing. Each of the domes is depressable for initiating transmission of a different signal from the other domes. For example, one signal causes a vehicle door to unlock and another signal causes the door to lock. As is well known in this art, such key fobs send a radio frequency signal through the air without any hardwire connection.

At least one of the domes includes two elements placed directly adjacent each other. Each of the elements is independently depressable for initiating transmission of a different signal from the other element. Therefore, it is possible for a single dome to transmit signals to both unlock and lock the vehicle door. The first element protrudes through the housing to a different height than the second element. This facilitates actuating only one of the elements without actuating the other.

Including the two functional elements in the single dome facilitates size reduction of the housing, and therefore of the key fob. The inventive domes capable of initiating transmission of two signals facilitate including more remotely operable vehicle devices on the vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
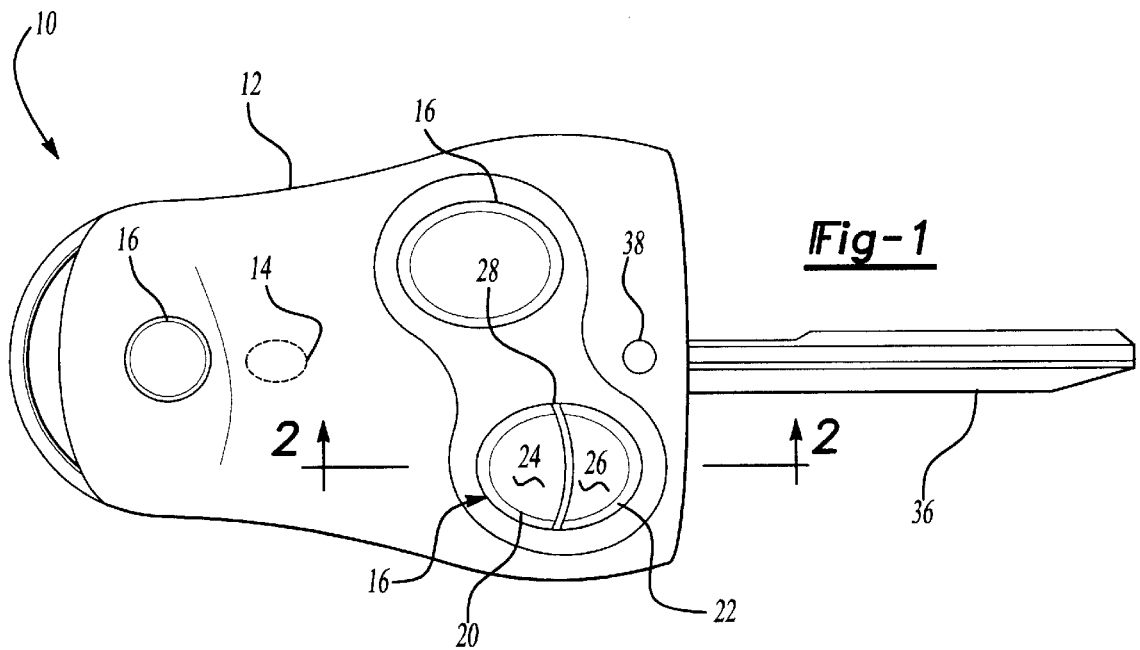
FIG. 1 is a top view of the housing of the subject invention.

Referring to FIG. 1, wherein like numerals indicate like or corresponding parts, a key fob assembly for signaling a receiver on a vehicle is generally shown at 10. The assembly 10 includes a housing 12 enclosing a transmitter 14, shown schematically, capable of transmitting multiple signals for actuating multiple vehicle devices. The assembly 10 transmits different signals for operating devices such as, for example, a door lock/unlock, a trunk lid, an emergency siren, and the like. The assembly 10 can also receive signals from the vehicle for sequencing the transmission codes between the transmitter 14 and the vehicle.

Flexible switch domes 16 protrude through the housing 12. In the preferred embodiment a plurality of domes 16 protrudes through the housing 12. Each of the domes 16 is formed from a single flexible barrier 18 (FIG. 2) disposed within the housing 12. Only the domes 16 protrude through the housing 12, therefore, the barrier 18 connecting the domes 16 is not visible. Each of the domes 16 is depressable for contacting underlying circuitry and initiating transmission of a different signal independently from the other domes 16. The domes 16 are biased in an upward position and therefore return to the upward position after being released from depression.

At least one of the domes 16 includes a first element 20 and a second element 22. Each of the elements 20, 22 is depressable for initiating transmission of a different signal independently from the other element. Thus, a single dome 16 is capable of initiating transmission of two signals. Including two elements 20, 22 in a single dome 16 reduce the size requirements of the housing 12 by reducing the required number of domes 16.

Figure 2:
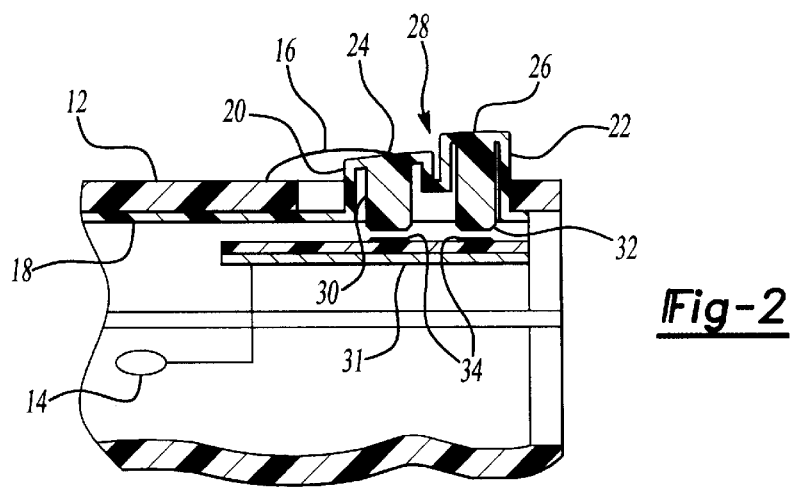
FIG. 2 is a partial sectional view of the subject invention along line 2—2 of FIG. 1.
Figure 3:
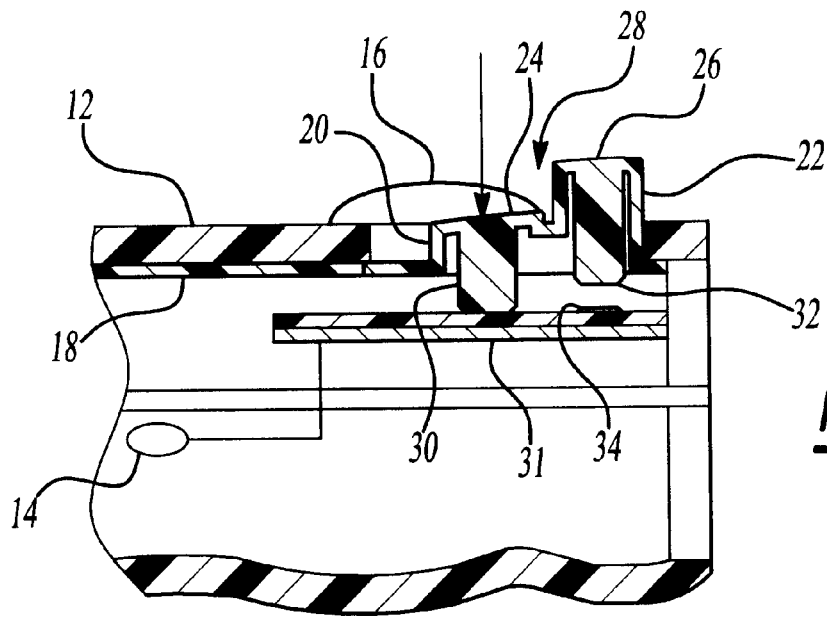
FIG. 3 is a partial sectional view of the subject invention along line 2—2 of FIG. 1 showing one of the elements depressed.
Figure 4:
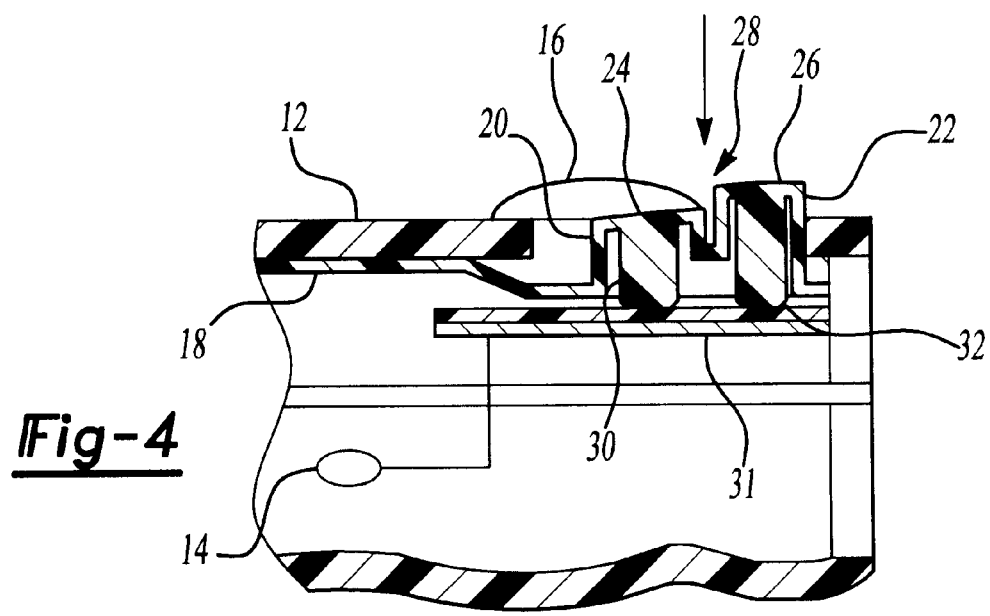
FIG. 4 is a partial sectional view of the subject invention along line 2—2 of FIG. 1 showing two of the elements depressed.

The first element 20 and the second element 22 define disparate depressable surfaces 24, 26. Thus, the first element 20 includes a first depressable surface 24, and the second element 22 includes a second depressable surface 26. The preferred embodiment, as best represented in FIGS. 2 through 4, shows the first element 20 protruding from the housing 12 to a different height than the second element 22. The different heights distinguish the first element 20 from the second element 22. Due to the different heights, it can be determined through touch alone which element 20,22 is being touched.

A notch 28 is disposed between the first element 20 and the second element 22 for separating the first element 20 from the second element 22. The notch 28 provides both a visible distinction between the two elements 20, 22 and a functional separation. Functionally, the notch 28 provides a flex point in the dome 16 allowing the depression of one of the elements independent of the other element.

The first element 20 includes a first plunger 30 disposed therebeneath. Similarly, the second element 22 includes a second plunger 32 disposed therebeneath. The plungers 30, 32 each contact a circuit trace board 31 upon depression of the plunger's 30, 32 respective elements 20, 22. When a plunger 30, 32 makes contact with the circuit trace board 31, a contact circuit 34 located below the plunger 30,32 is closed. As is known in the art of key fobs, a signal is transmitted corresponding to the particular contact circuit 34 that is closed. Thus, each dome 16, or each element 20, 22 initiates transmission of a different signal for actuating a different device upon the vehicle.

FIG. 3 shows only the first element 20 being depressed for initiating transmission of a signal independent of the signal initiated by the second element 22. FIG. 4 shows both elements 20, 22 being depressed simultaneously. The transmitter 14 can be programmed to ignore the contact circuit 34 for element 22 when the elements 20 and 22 are contacted simultaneously. The lower position of element 20 facilitates actuation of element 20 without actuation of element 22.

In the preferred embodiment, the different signals initiated by the first and the second elements 20, 22 actuate related controls. For example, depressing the first element 20 preferably initiates a signal causing a vehicle driver door to be unlocked, while depressing the second element 22 initiates a signal causing all vehicle doors to be unlocked. Other devices can also be actuated by depressing one of the two elements 20, 22 such as window express up/express down. Alternatively, it is not necessary to operate related controls with the two elements 20, 22. It is possible for each element 20, 22 to operate different devices The assembly 10 includes an indicator 38 for indicating transmission of a signal. The indicator 38 illuminates when the elements 20, 22 or the domes 16 are being depressed signaling that the transmitter 14 is powered and functioning properly. The absence of illumination when depressing a dome 16 or an element 20, 22 indicates that the transmitter 14 is not powered and that the power source needs to be replaced.

The inventive dome 16 has been represented in FIG. 1 on a key fob assembly 10 having an integral ignition key 36. However, the inventive dome 16 can also be disposed on a key fob assembly 10 not having an integral ignition key 36. The inventive dome 16 can also be disposed upon an assembly 10 that is separate from the ignition key 36 as is commonly practiced.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An electronic transmitter assembly comprising:

A housing;

A transmitter disposed within said housing and capable of transmitting at least a first and second signal;

At least one flexible dome protruding through said housing and including a first element depressable for initiating said first signal and a second element depressable independently of said first element for initiating said second signal different from said first signal; said first element has a surface which protrudes from said housing, wherein said surface is spaced further from said housing than other surfaces of said first element; said second element has a surface which protrudes from said housing, wherein said surface is spaced further from said housing than other surfaces of said second element;

Wherein said surface of said first element protrudes from said housing to a different height than said surface of said second element does with respect to said housing.

2. An assembly as set forth in claim 1 wherein said at least one dome includes a notch disposed between said first element and said second element for separating said first element from said second element.

3. An assembly as set forth in claim 2 wherein said first element includes a first plunger for contacting appropriate circuitry and sending said first signal upon depression of said first element for initiating transmission of said first signal.

4. An assembly as set forth in claim 3 wherein said second element includes a second plunger for contacting appropriate circuitry and sending said second signal upon depression of said second element for initiating transmission of the signal.

5. An assembly as set forth in claim 4, wherein said fist element is depressable along with said second element for initiating one of said first signal and said second signal.

6. An assembly as set forth in claim 5, wherein said second element does not extend as far outwardly of said housing as does said first element, such that said second element can be easily actuated separate from said first element.

7. An assembly as set forth in claim 6, wherein one of said first and second signal unlocks a drivers door and the other unlocks all vehicle doors.

8. A method of transmitting a first signal and a second signal from a remote control assembly to a receiver by depressing a flexible dome comprises:

Providing a first element which has a surface which protrudes further from a housing then other surfaces of said first element, and which protrudes to a different height then a surface on a second element which protrudes further from said housing then other surfaces of said second element;

Depressing said first element of said dome for transmitting said first signal; and Depressing said second element of said dome for transmitting said second signal.

9. A method as set forth in claim 8 further including the step of simultaneously depressing said first element and said second element for transmitting one of said first signal and said second signal.

10. An assembly as set forth in claim 1, wherein said housing is a key fob housing which is typically carried by a user.

11. An assembly as set forth in claim 1, wherein said transmitter transmits a signal through the air, without a hardwired connection.

12. An assembly as set forth in claim 10, wherein said key fob housing includes switches for unlocking and locking doors of a vehicle.

13. An assembly as set forth in claim 12, wherein said first and second elements control locking and unlocking of a vehicle door.

* * * * *